(12) United States Patent
Al-Farhan (10) Patent No.: US 10,375,940 B2
(45) Date of Patent: Aug. 13, 2019

(54) FISH TRAP WITH BUOY-ACTIVATED NET

(71) Applicant: Abdulmageed F. S. Al-Farhan, Safat (KW)

(72) Inventor: Abdulmageed F. S. Al-Farhan, Safat (KW)

( * ) Notice: Subject to any disclaimer, the term of this patent is extended or adjusted under 35 U.S.C. 154(b) by 0 days.

(21) Appl. No.: 16/149,049

(22) Filed: Oct. 1, 2018

(65) Prior Publication Data

US 2019/0098881 A1  Apr. 4, 2019

Related U.S. Application Data

(60) Provisional application No. 62/567,246, filed on Oct. 3, 2017.

(51) Int. Cl.

| *A01K 69/00* | (2006.01) |
| *A01K 69/06* | (2006.01) |
| *A01K 69/10* | (2006.01) |
| *A01K 73/12* | (2006.01) |
| *A01K 97/12* | (2006.01) |
| *A01K 71/00* | (2006.01) |

(52) U.S. Cl.
CPC .............. *A01K 73/12* (2013.01); *A01K 69/00* (2013.01); *A01K 69/06* (2013.01); *A01K 69/10* (2013.01); *A01K 71/00* (2013.01); *A01K 97/12* (2013.01)

(58) Field of Classification Search
CPC ........ A01K 69/00; A01K 69/04; A01K 69/06; A01K 69/08; A01K 69/10
USPC .......................................... 43/100, 102, 105
See application file for complete search history.

(56) References Cited

U.S. PATENT DOCUMENTS

| 113,292 | A | * | 4/1871 | Hammond | ............. | A01K 69/06 43/105 |
| 132,476 | A | * | 10/1872 | Livaudais | ............. | A01K 69/06 43/105 |
| 878,820 | A | * | 2/1908 | Murdoch | ............. | A01M 23/18 43/100 |
| 1,336,356 | A | * | 4/1920 | Johnson | ................. | A01K 69/00 43/105 |
| 1,521,474 | A | * | 12/1924 | Potthast | ................. | A01K 69/06 43/73 |
| 1,807,463 | A | * | 5/1931 | Anderson | ............. | A01K 69/06 43/79 |

(Continued)

FOREIGN PATENT DOCUMENTS

| CN | 105379687 A | 3/2016 | |
| FR | 2563080 A1 * | 10/1985 | ............. A01K 69/06 |

(Continued)

OTHER PUBLICATIONS

Translation of FR 2563080 (Oct. 1985).*

*Primary Examiner* — Darren W Ark (74) *Attorney, Agent, or Firm* — Richard C. Litman (57) ABSTRACT

The fish catching trap includes a substantially rigid round base having an open net surrounding it. A buoy or float is attached to the net by a line, the buoy being held stationary to an upper handle-like portion of the base using a nail or pin. The pin is attached to a string connected to fish bait placed in the bottom of the trap. When a fish disturbs or moves the bait, the string is pulled and the pin is released, allowing the buoy to quickly move upwards, closing the net surrounding the base and trapping any fish in the area. A second buoy serves as a visual indicator that the trap has been sprung.

20 Claims, 7 Drawing Sheets

(56) References Cited

U.S. PATENT DOCUMENTS

| | | | | |
|---|---|---|---|---|
| 1,903,276 A * | 3/1933 | Yanga | A01K 69/08 | 43/102 |
| 2,489,856 A * | 11/1949 | Buford | A01M 23/16 | 43/102 |
| 2,639,540 A * | 5/1953 | Buford | A01K 69/06 | 43/102 |
| 2,656,642 A * | 10/1953 | Richa | A01K 69/06 | 43/100 |
| 2,679,125 A * | 5/1954 | Howard | A01K 69/06 | 43/102 |
| 2,728,164 A * | 12/1955 | Mears | A01K 69/06 | 43/105 |
| 2,787,861 A * | 4/1957 | Hansen | A01K 69/06 | 43/102 |
| 3,055,139 A * | 9/1962 | Condello | A01K 69/06 | 43/102 |
| 3,426,472 A * | 2/1969 | Richard | A01K 69/08 | 43/100 |
| 3,508,358 A * | 4/1970 | Lee | A01K 69/06 | 43/105 |
| 3,815,279 A * | 6/1974 | Poirot | A01K 69/00 | 43/105 |
| 3,830,004 A * | 8/1974 | Poirot | A01K 73/12 | 43/14 |
| 3,852,908 A * | 12/1974 | Christopher | A01K 63/00 | 43/102 |
| 3,905,143 A * | 9/1975 | Poirot | A01K 69/00 | 43/105 |
| 3,939,597 A * | 2/1976 | McSherry | A01K 69/06 | 43/105 |
| 4,034,693 A * | 7/1977 | Challenger | A01K 69/08 | 114/333 |
| 4,092,797 A * | 6/1978 | Azurin | A01K 73/12 | 43/102 |
| 4,134,226 A * | 1/1979 | Petrella | A01K 69/06 | 43/102 |
| 4,141,172 A * | 2/1979 | Prosol | A01K 69/06 | 43/105 |
| 4,156,984 A * | 6/1979 | Kinser, Sr. | A01K 69/10 | 43/105 |
| 4,177,601 A * | 12/1979 | Morton | A01K 69/08 | 43/102 |
| 4,237,645 A * | 12/1980 | Kinser | A01K 69/06 | 43/102 |
| 4,237,646 A * | 12/1980 | Mims, III | A01K 69/06 | 43/10 |
| 4,244,323 A * | 1/1981 | Morimura | A01K 61/60 | 119/223 |
| 4,262,379 A * | 4/1981 | Jankiewicz | A01K 69/08 | 102/406 |
| 4,373,286 A * | 2/1983 | Robison | A01K 69/00 | 43/10 |
| 4,373,288 A * | 2/1983 | McCrink | A01K 69/06 | 43/100 |
| 4,393,617 A * | 7/1983 | Charnoske | A01M 23/245 | 43/100 |
| 4,406,083 A * | 9/1983 | Hart | A01K 69/06 | 43/105 |
| 4,434,575 A * | 3/1984 | Pearson | A01K 69/06 | 43/100 |
| 4,445,295 A * | 5/1984 | Litrico | A01K 69/06 | 43/100 |
| 4,473,967 A * | 10/1984 | Poirot | A01K 69/06 | 43/100 |
| 4,507,093 A * | 3/1985 | Norvell | B63C 7/10 | 251/297 |
| 4,538,376 A * | 9/1985 | Morton | A01K 69/08 | 43/100 |
| 4,594,804 A * | 6/1986 | Misko | A01K 69/06 | 43/105 |
| 4,644,682 A * | 2/1987 | Cloud | A01K 75/04 | 43/100 |
| 4,765,089 A * | 8/1988 | Rowe | A01K 69/06 | 43/102 |
| 4,831,774 A * | 5/1989 | Gonzalez | A01K 69/06 | 43/100 |
| 4,980,989 A * | 1/1991 | Davis | A01K 69/06 | 43/100 |
| 5,259,809 A * | 11/1993 | Rainey, Jr. | A01K 69/06 | 119/213 |
| 5,509,227 A * | 4/1996 | Marrero | A01K 71/00 | 43/100 |
| 5,555,666 A * | 9/1996 | Glatzer | A01K 69/06 | 43/100 |
| 5,673,510 A * | 10/1997 | Campbell | A01K 73/12 | 43/105 |
| 6,247,264 B1 * | 6/2001 | Prosol | A01K 69/06 | 43/100 |
| 6,261,142 B1 * | 7/2001 | Fiotakis | A01K 69/06 | 441/11 |
| 6,786,000 B1 * | 9/2004 | Hong | A01K 69/10 | 43/105 |
| 6,880,290 B2 * | 4/2005 | Mahoney | A01K 69/00 | 43/100 |
| 7,043,866 B2 * | 5/2006 | Burkovskiy | A01K 69/06 | 43/100 |
| 8,661,726 B2 * | 3/2014 | Alfarhan | A01M 23/20 | 43/105 |
| 8,661,727 B2 * | 3/2014 | Alfarhan | A01M 23/20 | 43/105 |
| 8,919,034 B2 * | 12/2014 | Alhuwaishel | A01K 69/06 | 43/100 |
| 2007/0264890 A1 * | 11/2007 | Brown | A01K 69/00 | 441/30 |
| 2008/0271362 A1 * | 11/2008 | Mikhail | A01K 69/06 | 43/100 |
| 2013/0109259 A1 * | 5/2013 | Abulrassoul | A01K 69/06 | 441/11 |
| 2018/0035653 A1 * | 2/2018 | Lawrence | A01K 80/00 | |
| 2019/0021297 A1 * | 1/2019 | Gittings | A01K 69/10 | |

FOREIGN PATENT DOCUMENTS

| | | | | |
|---|---|---|---|---|
| FR | 2656498 A1 * | 7/1991 | | A01K 69/08 |
| FR | 2848066 A1 * | 6/2004 | | A01K 69/00 |
| FR | 2848067 A1 * | 6/2004 | | A01K 69/00 |
| GB | 1221601 A * | 2/1971 | | A01K 69/08 |
| GB | 1516989 A * | 7/1978 | | A01K 69/08 |
| GB | 2150801 A * | 7/1985 | | A01K 69/06 |
| GB | 2178932 A * | 2/1987 | | A01K 69/08 |
| JP | 07008142 A * | 1/1995 | | |
| JP | 11225619 A * | 8/1999 | | |
| JP | 2001269109 A * | 10/2001 | | |
| JP | 2002136245 A * | 5/2002 | | |
| JP | 2003061551 A * | 3/2003 | | |
| JP | 2005073637 A * | 3/2005 | | |
| JP | 2005348716 A * | 12/2005 | | |
| JP | 2011229514 A * | 11/2011 | | |
| RU | 2127046 C1 * | 3/1999 | | |
| WO | WO-8904603 A1 * | 6/1989 | | A01K 69/10 |
| WO | WO-9845169 A1 * | 10/1998 | | A01K 69/06 |
| WO | WO-2008143582 A1 * | 11/2008 | | A01K 69/04 |
| WO | WO-2017042786 A1 * | 3/2017 | | A01M 23/02 |
| WO | WO-2018174258 A1 * | 9/2018 | | |

* cited by examiner

FISH TRAP WITH BUOY-ACTIVATED NET

CROSS-REFERENCE TO RELATED APPLICATION

This application claims the benefit of U.S. Provisional Patent Application Ser. No. 62/567,246, filed on Oct. 03, 2017.

BACKGROUND

1. Field

The present invention relates to fishing, and in particular, to a fish trap with a buoy-activated net.

2. Description of the Related Art

Fishing is one of the oldest methods of obtaining food. Fish can be caught using bait attached to a line, spear guns, fish traps and other methods. Conventional fish traps that are carried by commercial fishing boats are generally constructed of steel, wire or other rigid or semi-rigid materials. These traps have a capacity of 60 to 70 pounds of fish per trap. If the capacity of these traps could be increased, without increasing storage space or handling problems, the cost of harvesting the fish could be reduced. In addition, increasing the capacity of the trap should increase trap efficiency, as a greater portion of time during which the trap is in use for trapping is realized, as opposed to patrolling, emptying and redeploying the traps. The use of rigid traps makes increasing the size of these traps impractical, as the size, deck and trap storage capacity of typical 25 to 35 foot commercial fishing boats is limited. There is also an impact on safety, as larger heavier rigid traps create a safety hazard, particularly in rough seas. In addition, the ability to deploy more traps in different areas increases the chance of contacting worthwhile schools of fish. Thus, a fish trap with buoy-activated net solving the aforementioned problems is desired.

SUMMARY

The fish trap with buoy-activated net is a fish-catching trap that includes a substantially rigid round base having an open net surrounding it. A buoy or float is attached to the net by a line. The buoy is held stationary to an upper handle-like portion of the base using a nail or pin. The pin is attached to a string connected to fish bait placed in the bottom of the trap. When a fish disturbs or moves the bait, the string is pulled and the pin is released, allowing the buoy to quickly move upwards, closing the net surrounding the base and trapping any fish in the area. A second buoy serves as a visual indicator that the trap has been sprung.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
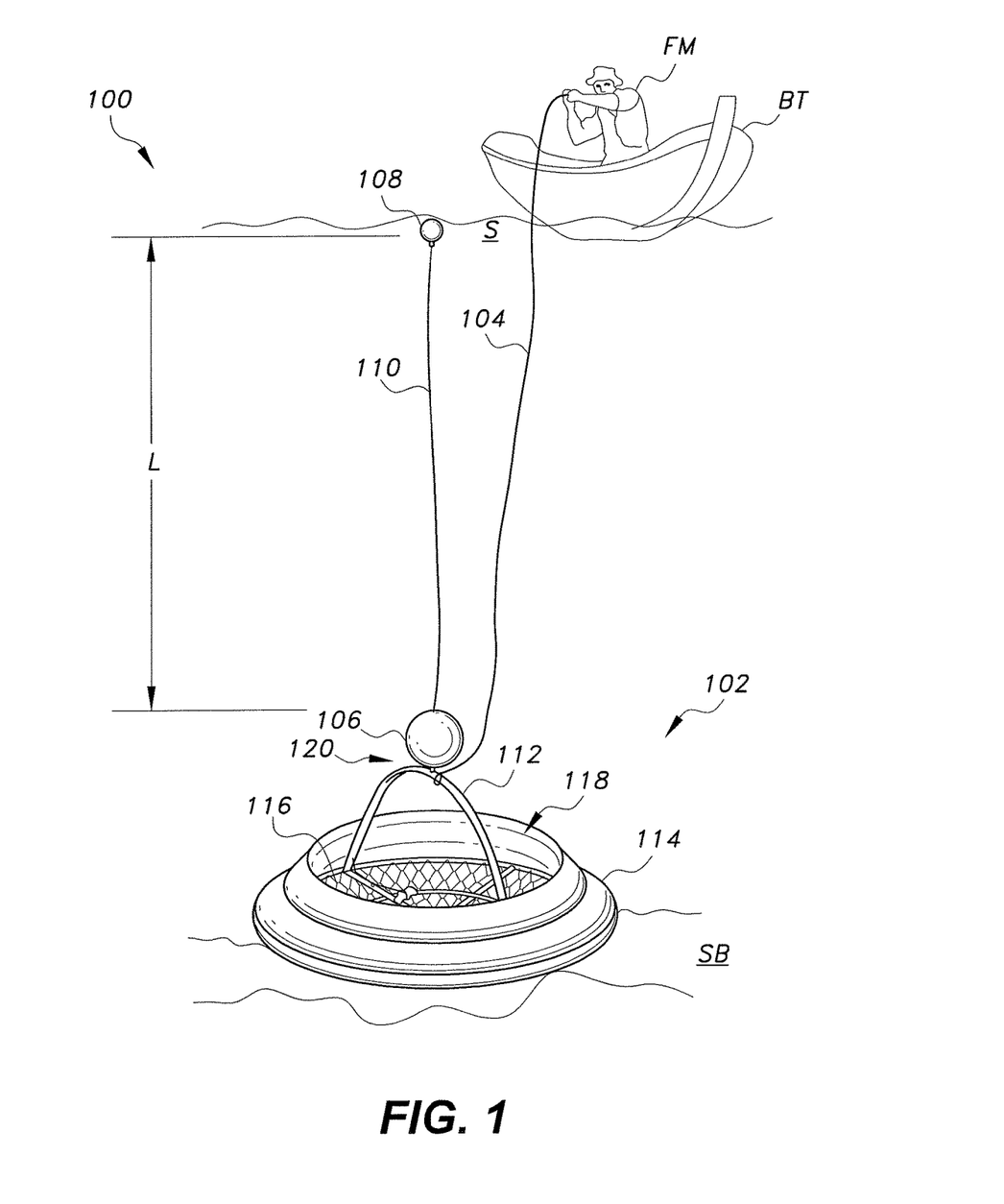
FIG. 1 is an environmental perspective view of a fish trap with buoy-activated net, showing the trap set in an un-sprung (open) position, waiting for fish.
Figure 2:
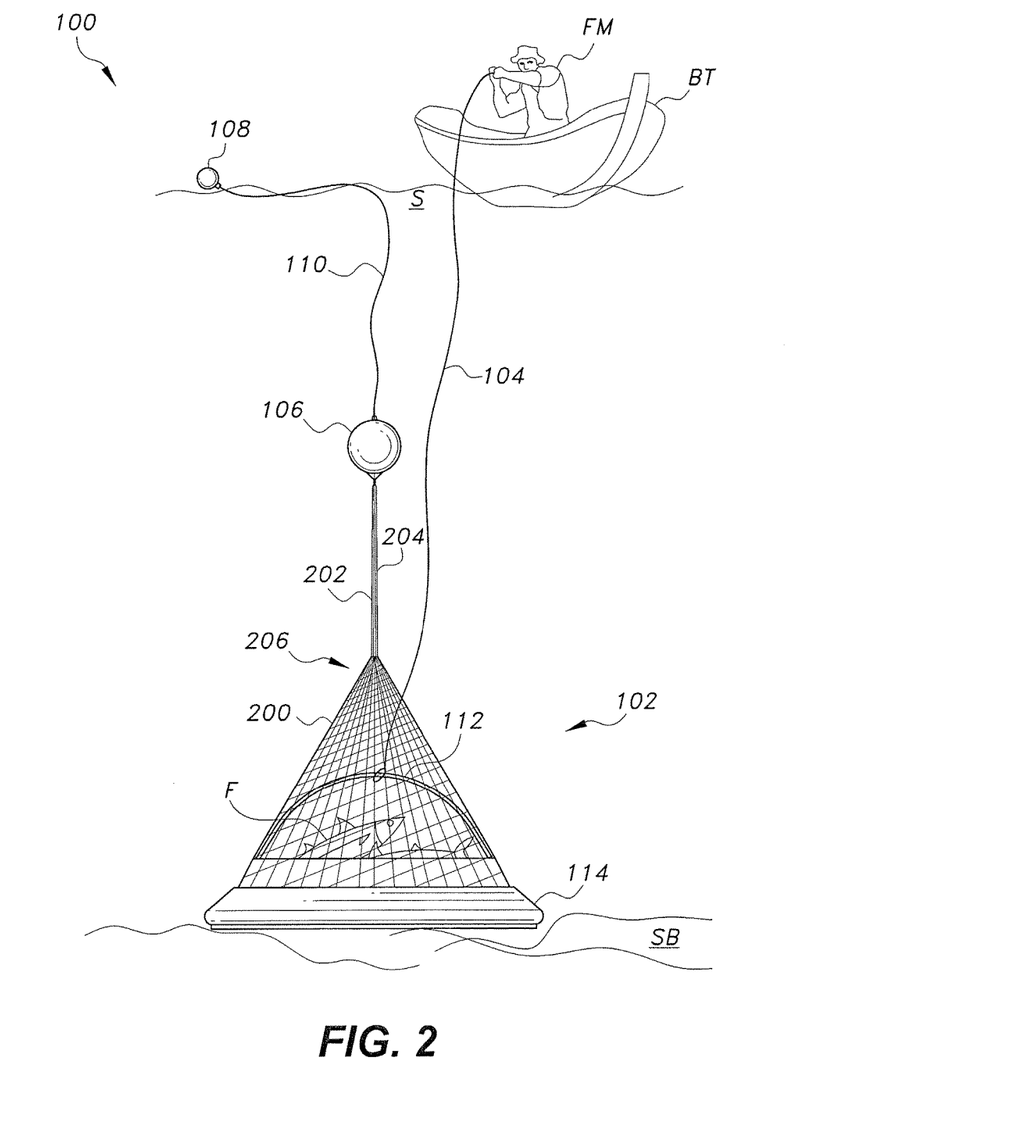
FIG. 2 is an environmental perspective view of the fish trap of FIG. 1, showing the trap in a sprung (closed) position, catching fish in the trap.

FIG. 1 shows the fish trap with buoy activated net, designated generally as 100 in the drawings, in an un-sprung (open) position, while FIG. 2 shows the fish trap 100 in a sprung (closed) position. The fish trap 100 is placed on the seabed SB of a body of water and includes a substantially rigid round base 102 having an upper net 200 surrounding it. A net-activating buoy or float 106 is attached to the net by two net gathering lines 202 and 204. The net-activating buoy 106 is held stationary to an upper frame member 112 of the base 102 using a buoy maintaining and releasing mechanism 120. It should be understood that the term "line" as used herein, is intended to include any suitable elongate structures, such as thread, rope, cord, string, fishing line, etc., and the actual line chosen would be based on the overall size of the trap 100 and the required strength of the line for the particular application. The upper frame member 112 is preferably arcuate, although other shapes are possible. The upper frame member 112 may also serve as a handle for carrying the fish trap 100. A trap-indicating buoy 108 is attached to the top of the net-activating buoy 106 by a trap-indicating buoy line 110. The trap-indicating buoy line 110 is of a length L, such that it is held just below the surface S of the body of water. When a fish F springs the buoy maintaining and releasing mechanism 120, as described in detail below, the net-activating buoy 106 is released to quickly move upwards, pulling the two net gathering lines 202 and 204 upwards, thereby closing an upper end 206 of the upper net 200 to surround the top of the base 102, trapping any fish F in the area of the base 102. Simultaneously, the trap-indicating buoy 108 moves to the surface S of the body of water, such that the trap-indicating buoy 108 serves as a visual indicator that the trap 100 has been sprung. A trap retrieval line 104 is attached to the upper frame member 112, so that once a fisherman FM in a boat BT sees the trap-indicating buoy 108 floating on the surface S of the body of water, he can use the trap retrieval line 104 to raise the trap 100 so it can be emptied, baited and un-sprung.

Figure 3:
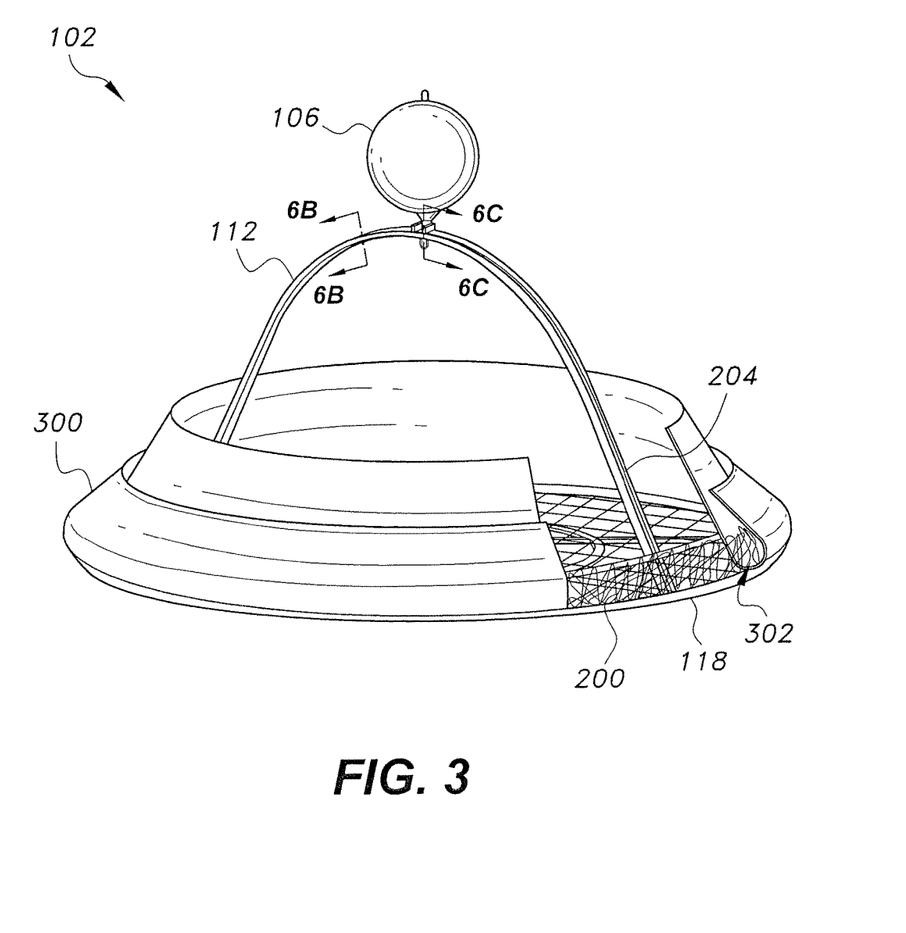
FIG. 3 is a fragmented perspective view of the base of the fish trap of FIG. 1, the shroud being broken away to show the location of the net within the shroud.
Figure 4:
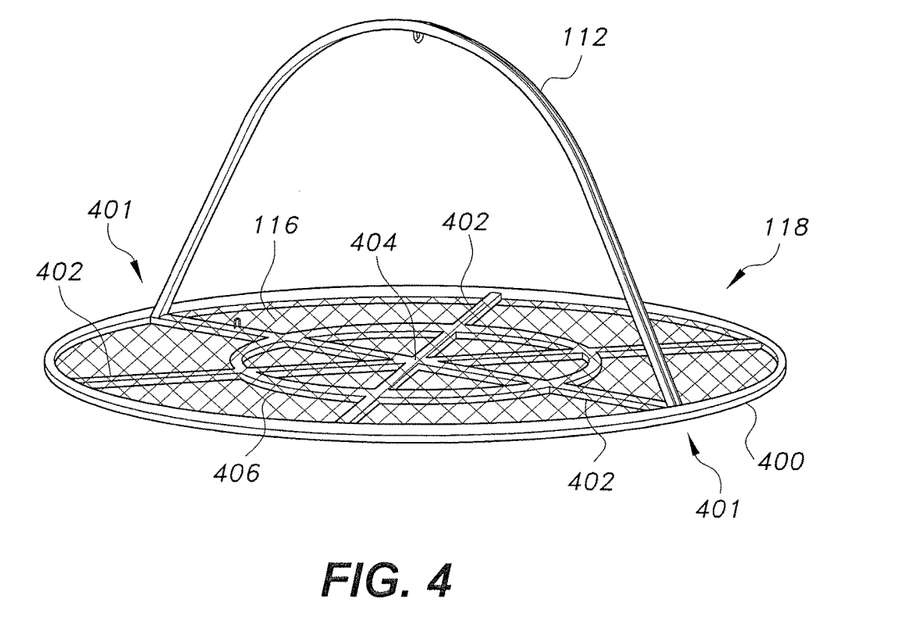
FIG. 4 is a perspective view of the upper and lower frame of the fish trap of FIG. 1, the trap being shown with the shroud removed to expose the frame.

The base 102 includes the upper frame member 112, which is attached to a lower frame member 118. The base 102 also includes a frustoconical shroud 114 for holding the upper net 200 when the trap 100 is in the un-sprung (open) position. The shroud 114 is attached to the upper frame member 112 and rests upon the lower frame member 118. As best seen in FIG. 3, the bottom of the shroud 114 curls 180° downward and outward around the circumference of the shroud 114 and a skirt 300 extends upward and tapers inward to define an annular pocket 302 having a narrow opening, the pocket 302 providing storage for the upper net 200 until the trap 100 is sprung. The pocket 302 keeps the upper net 200 off the seabed SB, avoids entanglement with any foreign objects on the seabed SB, reduces the ingress of any foreign objects into the pocket 302 that may foul the upper net 200, and hides the upper net 200 from the fish until it's too late to avoid the trap 100. The frustoconical shroud 114 is preferably made of a suitable plastic or polymeric material. As best seen in FIG. 4, the lower frame member 118 includes three ribs 402 that are connected to each other at a central joint 404 and extend outwardly to a circular outer frame member 400. One or more circular inner frame members 406 may be provided for additional strength, depending on the size of the trap 100. The upper frame member 112 is attached to the circular outer frame member 400 at its diametrically opposite ends 401. A lower net 116 is positioned on top of the ribs 402 and the circular inner frame members 406 and is connected to the circular outer frame member 400 in order to maintain any fish F within the fish trap 100 and prevent loss of fish through the bottom of the trap 100 as the fish trap 100 is raised to the surface S of the body of water.

Figure 5:
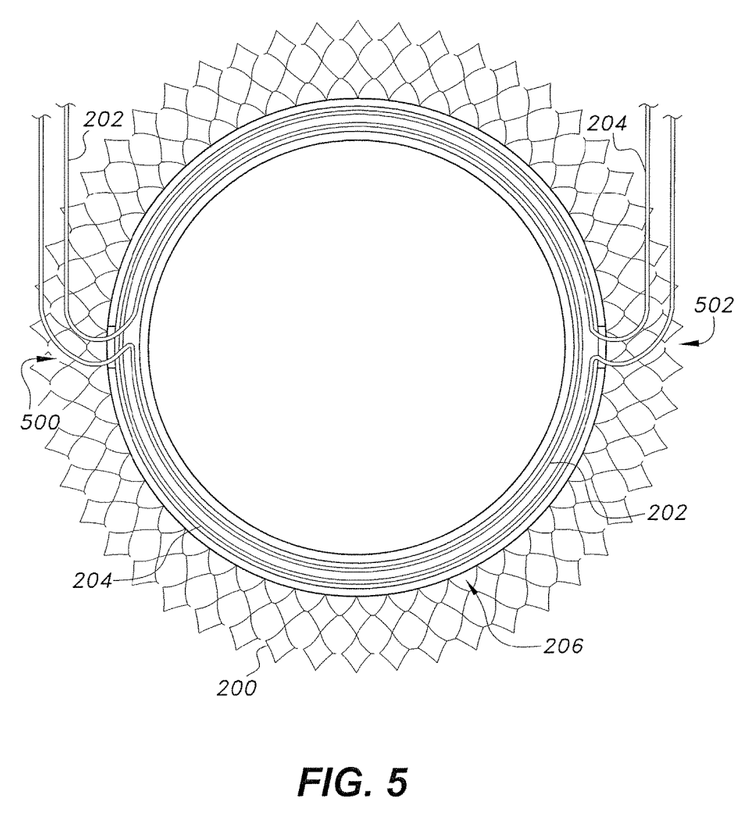
FIG. 5 is an enlarged partial top view of the upper portion of the upper net of the fish trap of FIG. 1, showing the net gathering lines closing the upper net when the trap is in a sprung (closed) position.

As shown in FIG. 5, the two net gathering lines 202 and 204 are both in the form of a loop. The net gathering line 202 is routed through a first side 500 of the upper end 206 of the upper net 200, around the upper end 206 of the upper net 200, and back through the first side 500 of the upper end 206 of the upper net 200. The net gathering line 204 is routed through a second side 502 of the upper end 206 of the upper net 200, opposite the first side 500 of the upper end 206 of the upper net 200. The net gathering line 204 extends around the upper end 206 of the upper net 200, and back through the second side 502 of the upper end 206 of the upper net 200. In this manner, when the two net gathering lines 202 and 204 are pulled upward by the net activating buoy 106, they close the upper end 206 of the upper net 200.

Figure 6A:
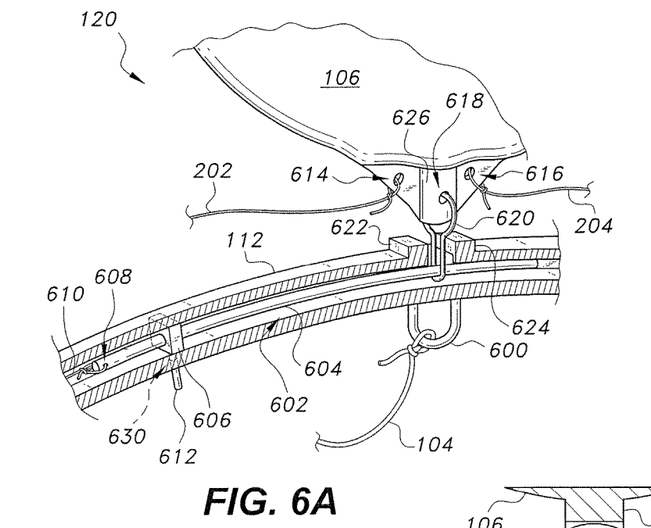
FIG. 6A is partial perspective view of the fish trap of FIG. 1, showing the mechanism for maintaining and releasing the buoy.
Figure 6B:
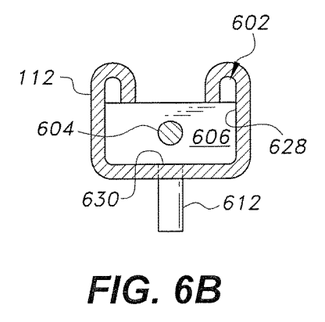
FIG. 6B is a section view taken through lines 6B-6B of FIG. 3.
Figure 6C:
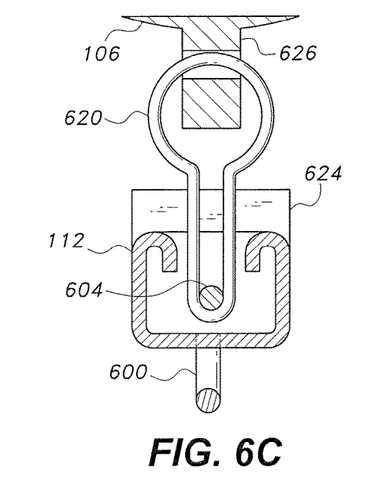
FIG. 6C is a section view taken through lines 6C-6C of FIG. 3.

The details of the net activating buoy 106 and the buoy maintaining and releasing mechanism 120 are shown in FIGS. 6A-6C. The net activating buoy 106 includes a lower flange 626, the flange 626 having a first hole 614 that is used to attach the first net gathering line 202 to the net activating buoy 106 using a suitable knot and a second hole 616 that is used to attach the second net gathering line 204 to the net activating buoy 106, also using a suitable knot. A third hole 618 has a looped bracket or link 620 extending therethrough. A first bar 622 and a second bar 624 extend across the top and perpendicular to the upper frame member 112. The first bar 622 and the second bar 624 are spaced apart from one another, so that the bracket 620 can fit between them. A buoy release pin 604 is routed longitudinally in the channel or interior 602 of the upper frame member 112, beneath the bars 622 and 624 and through the looped bracket 620, such that the buoy 106 cannot float upward while the pin 604 is in the position shown. A buoy releasing line 610 is attached to the buoy release pin 604 by tying the buoy releasing line 610 through a hole 608 of the buoy release pin 604, using a suitable knot. The buoy releasing line 610 extends longitudinally in the channel 602 of the upper frame member 112, from the buoy release pin 604 to the bait holder as described with respect to FIG. 7. When a fish pulls the bait (as described below), the buoy release pin 604 is pulled out of the looped bracket 620, and the buoy 106 is released to float upward, thereby pulling the first net gathering line 202 and the second net gathering line 204, such that the first net gathering line 202 and the second net gathering line 204 close the upper net 104 as described with respect to FIG. 5, above. The buoy release pin 604 extends through a pin guide block 606 that contacts the sides 628 of the interior 602 of the upper frame member 112 and maintains the buoy release pin 604 in the approximate center of the interior 602 of the upper frame member 112. A locking pin 612 extends through a hole 630 in the bottom of the upper frame member 112 and into the pin guide block 606, to thereby lock the buoy release pin 604 and holding the buoy 106 to the upper frame member 112. Also shown in FIG. 6A is a looped bracket 600 that is attached to the lower surface of the upper frame member 112, approximately in the center of the upper frame member 112. The looped bracket 600 provides a location for attaching the trap retrieval line 104 to the upper frame member 112, using a suitable knot.

Figure 7:
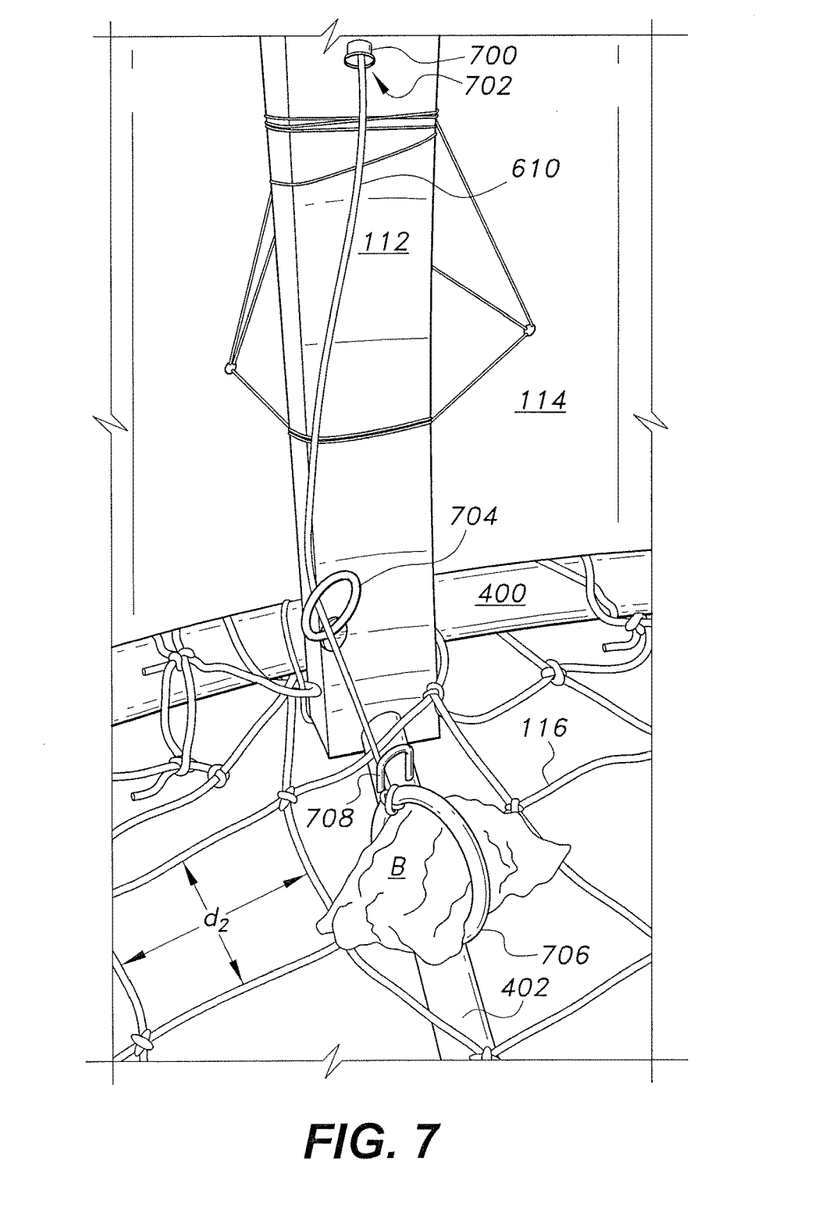
FIG. 7 is a partial perspective view of the bait holder of the fish trap of FIG. 1.

The details of the bait holder of the fish trap 100 are shown in FIG. 7. The buoy releasing line 610 is routed from channel 602 of the upper frame member 112, through a central hole 702 of a tube 700 and through a hole (not shown) in the upper frame member 112. The buoy releasing line 610 is further routed through a ring-shaped line guide 704 that is attached to the inside surface of the upper frame member 112 through a loop-shaped line guide 708 attached to the top of one of the ribs 402 and is attached to bait B by a bait engaging strap 706. The bait engaging strap 706 may be elastic to firmly hold the bait B and is attached to the buoy releasing line 610 by tying the buoy releasing line 610 around the bait engaging strap 706, using a suitable knot. When a fish pulls the bait B away from the upper frame member 112, the buoy releasing line 610 is pulled downward and along the interior 602 of the upper frame member 112, by engagement with the ring 704, such that the buoy release pin 604 is pulled out of the looped bracket 620, thereby releasing the buoy 106, and closing the upper net 104 as described above. As can also be seen in FIG. 7, the lower net 116 is formed in a manner such that parallel lines of the lower net 104 have a spacing of d2 between them. While d2 can be appropriately sized, depending on the size of the trap 100 and the size of the fish F being trapped, preferably d2 is approximately 7 cm.

It is to be understood that the fish trap with a buoy activated net is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A fish trap with buoy-activated net, comprising:
   a base having an upper frame member;
   an upper net stored in the base;
   a net-activating buoy having a set position where the buoy is held against the upper frame member and a released position where the buoy is raised by buoyant forces away from the upper frame member, the net-activating buoy pulling the upper net upward and closing the upper net to enclose the trap from the base to above the upper frame member, trapping any fish between the base and the upper frame member;
   at least one net gathering line connecting the upper net to the net-activating buoy for pulling the upper net upward and closing the upper net;
   a retaining pin slidably attached to the net-activating buoy for selectively holding the net-activating buoy to the upper frame member in the set position;
   a bait holder; and a buoy releasing line having a first end connected to the bait holder and a second end connected to the retaining pin;

wherein when the bait holder is moved away from the upper frame member, the retaining pin releases the net-activating buoy to the released position, pulling the upper net upward and closing the upper net to trap any fish between the base and the upper frame member.

2. The fish trap according to claim 1, wherein the at least one net gathering line comprises a first net gathering line and a second net gathering line.

3. The fish trap as recited in claim 2, wherein the net activating buoy comprises a lower flange, the lower flange having a first hole defined therein and a second hole defined therein, the first net gathering line extending through the first hole and the second net gathering line extending through the second hole.

4. The fish trap as recited in claim 3, wherein the lower flange has a third hole defined therein, the fish trap further comprising a first looped bracket extending through the third hole, the retaining pin selectively engaging the first looped bracket.

5. The fish trap as recited in claim 4, wherein the upper frame member includes a channel defined therein, the retaining pin extending longitudinally through the channel of the upper frame member, the retaining pin being slidable in the channel between the set position in which the retaining pin extends through the first looped bracket to hold the net-activating buoy against the upper frame member and the released position in which the buoy is raised by buoyant forces away from the upper frame member, the net-activating buoy pulling the upper net upward and closing the upper net to enclose the trap from the base to above the upper frame member, trapping any fish between the base and the upper frame member.

6. The fish trap as recited in claim 5, further comprising a pin guide block contacting sides of the channel of the upper frame member, the retaining pin extending through the pin guide block, the pin guide block maintaining the retaining pin in an approximate center of the channel of the upper frame member.

7. The fish trap as recited in claim 6, further comprising a locking pin, the upper frame member having a bottom and a hole defined in the bottom, the locking pin extending through the hole in the bottom of the upper frame member and into the pin guide block to lock the retaining pin and hold the net-activating buoy against the upper frame member.

8. The fish trap as recited in claim 5, wherein the upper frame member has an inside surface, the fish trap further comprising a tube mounted on the inside surface of the upper frame member, the tube having a central hole, the buoy releasing line extending longitudinally in the channel of the upper frame member from the retaining pin through the central hole of the tube and to the bait holder.

9. The fish trap as recited in claim 8, further comprising a ring-shaped line guide attached to the inside surface of the upper frame member, the buoy releasing line extending through the ring-shaped line guide.

10. The fish trap as recited in claim 9, wherein said base has a lower frame member, the fish trap further comprising a loop-shaped line guide attached to the lower frame member, the buoy releasing line extending through the loop-shaped line guide.

11. The fish trap as recited in claim 4, wherein the upper frame member has a lower surface, the fish trap further comprising a second looped bracket attached approximately in a center of the upper frame member.

12. The fish trap as recited in claim 11, further comprising a trap retrieval line attached to the second looped bracket.

13. The fish trap as recited in claim 1, wherein:
the upper frame member is arcuate and includes two lower ends;
the base further comprises a lower frame member; and
the two lower ends of the upper frame member are attached to the lower frame member.

14. The fish trap as recited in claim 13, wherein the base further comprises a shroud attached to the upper frame member and resting on the lower frame member.

15. The fish trap as recited in claim 14, wherein said shroud further comprises an annular pocket extending around the base, said upper net being stored in the pocket in the set position.

16. The fish trap as recited in claim 15, wherein:
the lower frame member includes a circular outer frame member and ribs connected to each other at a central joint and extending outward to the circular outer frame member;
the two lower ends of the upper frame member are attached to the circular outer frame member; and
the fish trap further comprises a lower net which is positioned on top of the ribs and is connected to the circular outer frame member, said shroud being frustoconical in shape.

17. The fish trap as recited in claim 16, wherein the shroud is made of a plastic material.

18. The fish trap as recited in claim 1, wherein the bait holder comprises an elastic bait engaging strap.

19. The fish trap as recited in claim 1, further comprising a trap indicating buoy and a trap indicating buoy line attaching the trap indicating buoy to a top of the net-activating buoy.

20. The fish trap as recited in claim 19, wherein the trap indicating buoy line has a length such that the trap indicating buoy is held just below a surface of a body of water in which the trap is located when the trap is in the set position and the trap indicating buoy moves to the surface of the body of water when the net-activating buoy is in the released position, thereby serving as a visual indicator that the trap has been sprung.

* * * * *